US012322006B2

(12) United States Patent
Goldberg et al.

(10) Patent No.: US 12,322,006 B2
(45) Date of Patent: Jun. 3, 2025

(54) AUGMENTED REALITY ENHANCEMENT OF MOVING IMAGES

(71) Applicant: Disney Enterprises, Inc., Burbank, CA (US)

(72) Inventors: Evan M. Goldberg, Burbank, CA (US); Alexandra Christiansen, Van Nuys, CA (US); Jackson Aaron Rogow, Los Angeles, CA (US); Nicholas Maggio, Pittsford, NY (US)

(73) Assignee: Disney Enterprises, Inc., Burbank, CA (US)

( * ) Notice: Subject to any disclaimer, the term of this patent is extended or adjusted under 35 U.S.C. 154(b) by 65 days.

(21) Appl. No.: 17/887,731

(22) Filed: Aug. 15, 2022

(65) Prior Publication Data

US 2024/0054689 A1     Feb. 15, 2024

(51) Int. Cl.
  *G06F 3/14*   (2006.01)
  *G06T 11/00*  (2006.01)
  *G06V 20/20*  (2022.01)
  *G06V 20/40*  (2022.01)

(52) U.S. Cl.
  CPC .............. *G06T 11/00* (2013.01); *G06V 20/20* (2022.01); *G06V 20/46* (2022.01); *G06V 20/48* (2022.01)

(58) Field of Classification Search
  CPC ........ G06T 11/00; G06V 20/46; G06V 20/48; G06V 20/20
  See application file for complete search history.

(56) References Cited

U.S. PATENT DOCUMENTS

| 5,970,504 A | 10/1999 | Abe |
| 9,355,617 B2 | 5/2016 | Izumihara et al. |
| 10,075,758 B2 | 9/2018 | Ayers |

(Continued)

FOREIGN PATENT DOCUMENTS

| CN | 112738540 A | 4/2021 | |
| EP | 3121688 A1 * | 1/2017 | ........... G06F 1/1626 |

(Continued)

OTHER PUBLICATIONS

International Search Report and Written Opinion dated Sep. 26, 2023 for International Application PCT/US2023/025471.

(Continued)

*Primary Examiner* — Samantha (Yuehan) Wang
(74) *Attorney, Agent, or Firm* — Farjami & Farjami LLP (57) ABSTRACT

A media enhancement system includes an augmented reality (AR) device having a display, processing hardware, and a memory storing software code. The processing hardware executes the software code to monitor media content including a sequence of moving images displayed on a display screen separate from the AR device, receive playhead data indicating a playhead state of a media playout device playing out the media content, and detect, based on monitoring the media content, one or more image(s) in the sequence of moving images as one or more anchor image(s). The software code is further executed to obtain, using the anchor image(s), one or more AR effect(s) associated with the anchor image(s), and render, based on the playhead data, the AR effect(s) on the display of the AR device, wherein the AR effect(s) is/are spatially and temporally aligned with the sequence of moving images being displayed on the display screen.

22 Claims, 8 Drawing Sheets

(56) References Cited

U.S. PATENT DOCUMENTS

| | | |
|---|---|---|
| 10,078,917 B1 | 9/2018 | Gaeta et al. |
| 11,238,656 B1 * | 2/2022 | Lin ..................... G06T 19/006 |
| 2002/0089530 A1 | 7/2002 | Markel |
| 2009/0024617 A1 | 1/2009 | Cope |
| 2010/0053164 A1 | 3/2010 | Imai et al. |
| 2011/0285704 A1 | 11/2011 | Takeda et al. |
| 2012/0127284 A1 | 5/2012 | Bar-Zeev et al. |
| 2016/0163063 A1 | 6/2016 | Ashman |
| 2017/0201808 A1 | 7/2017 | Chowdhary et al. |
| 2018/0191769 A1 | 7/2018 | Anderson |
| 2018/0367835 A1 | 12/2018 | Hamidi-Rad et al. |
| 2019/0222776 A1 | 7/2019 | Carter et al. |
| 2020/0035025 A1 | 1/2020 | Crocker et al. |
| 2020/0201514 A1 | 6/2020 | Murphy |
| 2020/0219294 A1 | 7/2020 | Badr |
| 2020/0260154 A1 * | 8/2020 | Comito ................ H04N 21/437 |
| 2020/0294313 A1 | 9/2020 | Arroyo Palacios et al. |
| 2020/0342231 A1 | 10/2020 | Richter et al. |
| 2020/0364937 A1 | 11/2020 | Selbrede |
| 2021/0096638 A1 | 4/2021 | O'Hern et al. |
| 2021/0150212 A1 | 5/2021 | Richey |
| 2021/0248669 A1 | 8/2021 | Wade |
| 2021/0263587 A1 * | 8/2021 | Zhu ......................... G06F 3/013 |
| 2021/0326594 A1 | 10/2021 | Costello et al. |
| 2021/0342590 A1 | 11/2021 | Choi et al. |
| 2022/0005322 A1 | 1/2022 | Pilnock et al. |
| 2023/0206568 A1 | 6/2023 | Du et al. |
| 2023/0316683 A1 | 10/2023 | Hare et al. |

FOREIGN PATENT DOCUMENTS

| | | | |
|---|---|---|---|
| EP | 3386204 | 10/2018 | |
| WO | WO-2015192117 A1 * | 12/2015 | ............. A63F 13/00 |
| WO | WO 2016001908 A1 | 1/2016 | |
| WO | WO 2021085130 A1 | 5/2021 | |

OTHER PUBLICATIONS

International Search Report and Written Opinion dated Sep. 18, 2023 for International Application PCT/US2023/025477.
International Search Report for PCT/US/2023/025476 dated Sep. 4, 2023.
File History of U.S. Appl. No. 17/887,742, filed Aug. 15, 2022.
File History of U.S. Appl. No. 17/887,754, filed Aug. 15, 2022.

* cited by examiner

AUGMENTED REALITY ENHANCEMENT OF MOVING IMAGES

BACKGROUND

Advances in computer technology and software have made possible the generation of richly featured augmented reality (AR) experiences for users. AR experiences can merge virtual objects or characters with real-world features in a way that can, in principle, provide a powerfully interactive experience. AR can further be used to extend content from displays into people's homes and personal environments.

However, while AR aligned with static elements (images, planes, and objects) is common, there is a need in the art for systems and methods designed to generate AR imagery that conforms to moving images, aligning the AR imagery both spatially and temporally with those moving images.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing augmented reality (AR) enhancement of moving images. It is noted that, as defined in the present application, the term "moving images" refers to imagery produced by playout of a sequence of video frames. Moreover, as defined herein, the term "anchor image" refers to an image serving as a two-dimensional (2D) image template upon which one or more AR effects may be overlaid, or from which one or more AR effects may extend into an environment in which a display screen displaying the anchor image is located. In various use cases, an anchor image may be a single video frame in its entirety, an image included in a portion of a single video frame that is less than the entire video frame, or to a sequence of multiple video frames. It is further noted that the AR enhancement solution disclosed in the present application may be implemented as automated systems and methods.

As used in the present application, the terms "automation," "automated," and "automating" refer to systems and processes that do not require the participation of a human administrator. Although in some implementations the AR enhancements provided by the systems and methods disclosed herein may be reviewed or even modified by a human editor or system administrator, that human involvement is optional. Thus, the methods described in the present application may be performed under the control of hardware processing components of the disclosed systems.

Figure 1:
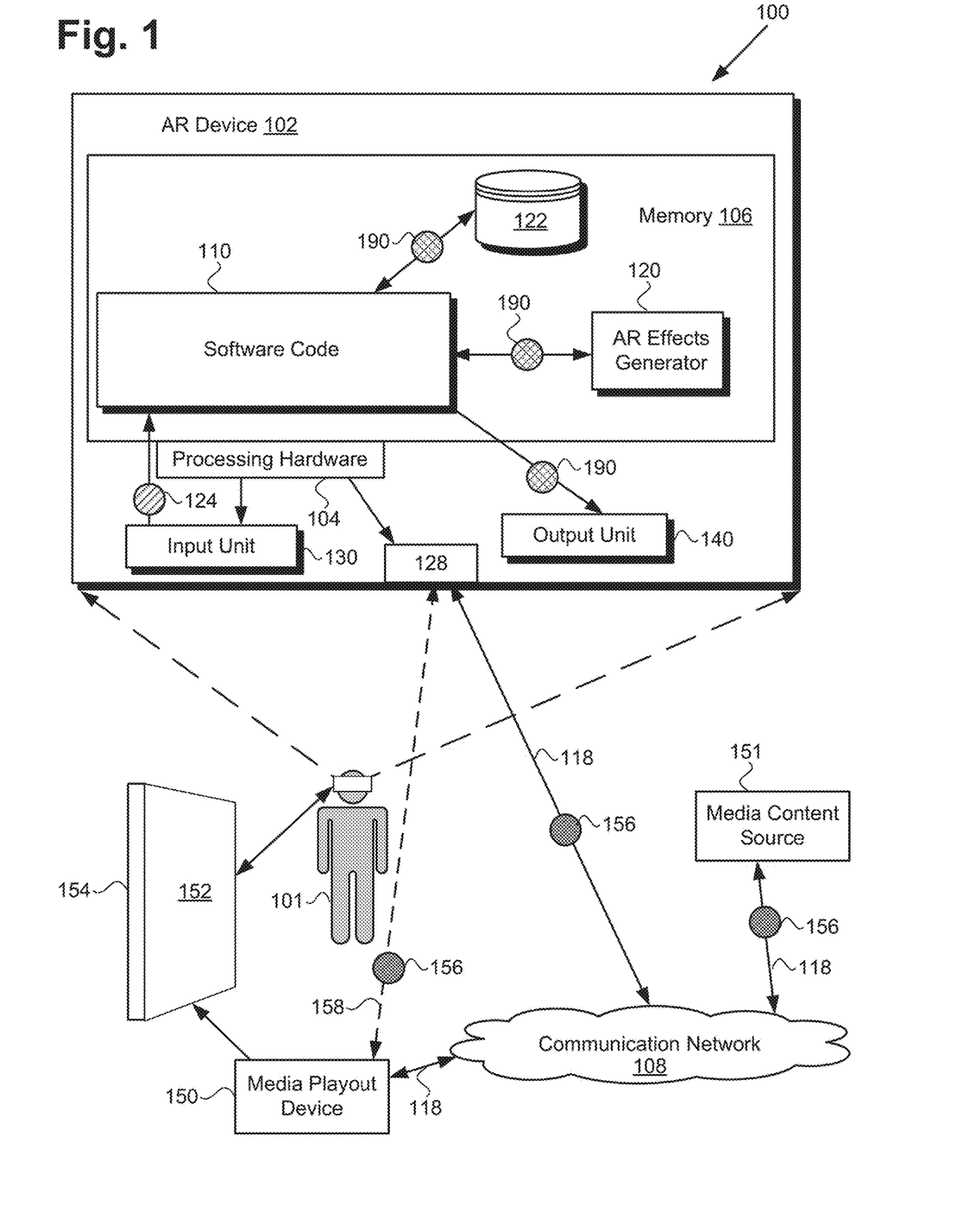
FIG. 1 shows an exemplary system for providing augmented reality (AR) enhancement of moving images, according to one implementation.

FIG. 1 shows exemplary media enhancement system 100 configured to provide AR enhancement of moving images, according to one implementation. Media enhancement system 100 includes AR device 102 having processing hardware 104, input unit 130, output unit 140, transceiver 128, and memory 106 implemented as a computer-readable non-transitory storage medium. As shown in FIG. 1, according to the present exemplary implementation, memory 106 stores software code 110, optional AR effects generator 120, and optional AR effects database 122.

As further shown in FIG. 1, media enhancement system 100 is implemented within a use environment including user 101 of AR device 102, media content 152 including a sequence of moving images displayed on display screen 154, media playout device 150 playing media content 152 being displayed on display screen 154, media content source 151, and communication network 108. It is noted that the sequence of moving images included in media content 152 may be monoscopic or stereoscopic.

FIG. 1 also shows location data 124 for use in determine the position of display screen 154 in relation to AR device 102, one or more AR effects 190 (hereinafter "AR effect(s) 190") obtained by software code 110 from one of AR effects generator 120 or AR effects database 122, and playhead data 156 indicating the playhead state of media playout device 150. In addition, FIG. 1 further shows wireless communication link 158 between AR device 102 and media playout device 150, as well as network communication links 118 of communication network 108, which may be used by AR device 102 to interactively connect with one or both of media playout device 150 and media content source 151.

Although FIG. 1 depicts AR effects generator 120 and AR effects database 122 as being elements of AR device 102, stored in memory 106, that representation is merely exemplary. In other implementations, one or both of AR effects generator 120 and AR effects database 122 may be omitted from media AR device 102, but may be accessible to AR device 102 via communication network 108 and network communication links 118 as remote resources.

Moreover, although the present application refers to software code 110 and one or both of AR effects generator 120 and AR effects database 122 as being stored in memory 106 for conceptual clarity, more generally, memory 106 may take the form of any computer-readable non-transitory storage medium. The expression "computer-readable non-transitory storage medium." as defined in the present application, refers to any medium, excluding a carrier wave or other transitory signal that provides instructions to processing hardware 104 of AR device 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of AR device 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

As defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data.

Transceiver 128 of system 100 may be implemented as any suitable wireless communication unit. For example, transceiver 128 may be implemented as a fourth generation (4G) wireless transceiver, or as a 5G wireless transceiver. In addition, or alternatively, transceiver 128 may be configured for communications using one or more of Wireless Fidelity (Wi-Fi), Worldwide Interoperability for Microwave Access (WiMAX). Bluetooth. Bluetooth low energy, ZigBee, radio-frequency identification (RFID), near-field communication (NFC), and 60 GHz wireless communications methods.

Figure 2A:
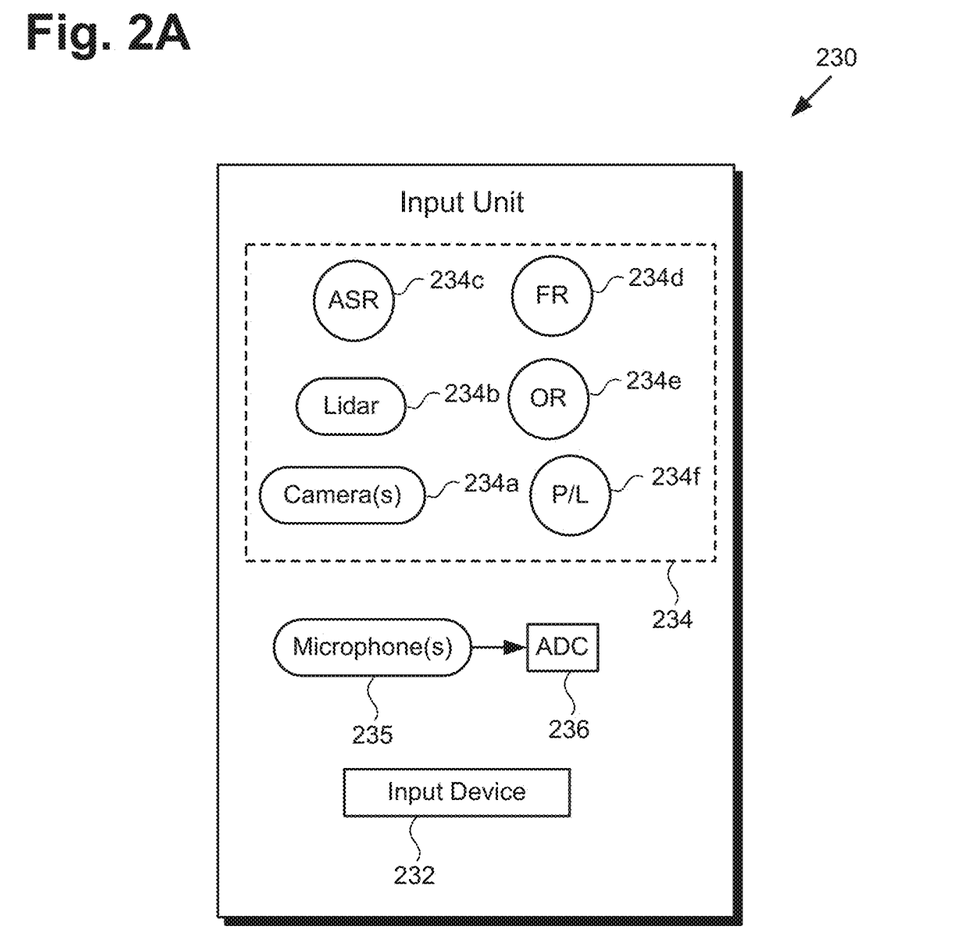
FIG. 2A shows a more detailed diagram of an input unit suitable for use as a component of the system shown in FIG. 1, according to one implementation.

FIG. 2A shows a more detailed diagram of input unit 230 suitable for use as a component of AR device 102, in FIG. 1, according to one implementation. As shown in FIG. 2A, input unit 230 may include input device 232, such as a touchscreen or keyboard for example, as well as multiple sensors, sensing modules, or sensors and sensing modules 234 (hereinafter "sensors/sensing modules 234"), one or more microphones 235 (hereinafter "microphone(s) 235"), and analog-to-digital converter (ADC) 236. As further shown in FIG. 2A, sensors/sensing modules 234 of input unit 230 may include one or more cameras 234a (hereinafter "camera(s) 234a"); laser imaging, detection, and ranging (lidar) detector 234b; automatic speech recognition (ASR) module 234c; facial recognition (FR) module 234d; object recognition (OR) module 234e; and one or more position/location sensors 234f (hereinafter "P/L sensor(s) 234f").

Camera(s) 234a may include various types of cameras, such as one or more red-green-blue (RGB) still image cameras, video cameras. RGB-D cameras that include a depth sensor, infrared (IR) cameras, or combinations thereof to name a few examples. P/L sensor(s) 234f may include one or more accelerometers, one or more gyroscopes, a Global Positioning System (GPS) receiver, a magnetometer, or any combination of such features, for example. In some implementations, P/L sensor(s) 234f may be implemented as an inertial measurement unit (IMU).

Input unit 230 corresponds in general to input unit 130, in FIG. 1. Thus, input unit 130 may share any of the characteristics attributed to input unit 230 by the present disclosure, and vice versa. It is noted that the specific sensors shown to be included among sensors/sensing modules 234 of input unit 130/230 are merely exemplary, and in other implementations, sensors/sensing modules 234 of input unit 130/230 may include more, or fewer, sensors than camera(s) 234a, lidar detector 234b, ASR module 234c, FR module 234d, OR module 234e, and P/L sensor(s) 234f. For example, in addition to, or as alternatives to the specific sensors shown in FIG. 2A, input unit 130/230 may include sensors for detecting one or more of ambient light, temperature, and atmospheric pressure, to name a few.

Figure 2B:
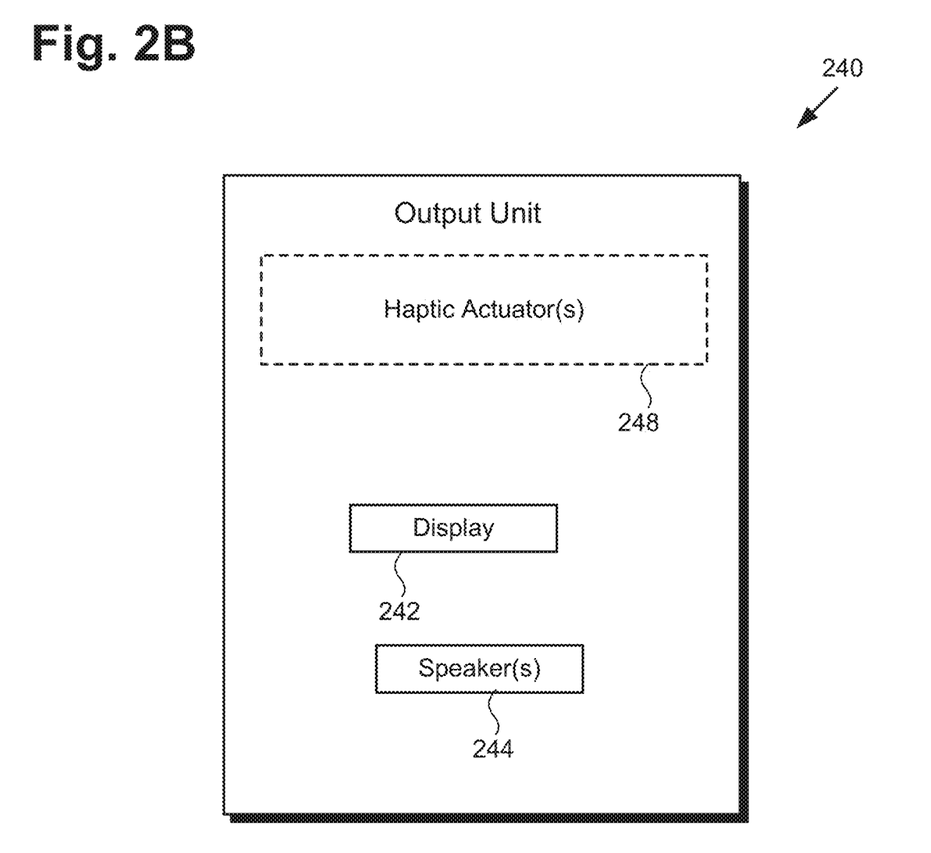
FIG. 2B shows a more detailed diagram of an output unit suitable for use as a component of the system shown in FIG. 1, according to one implementation.

FIG. 2B shows a more detailed diagram of output unit 240 suitable for use as a component of AR device 102, in FIG. 1, according to one implementation. As shown in FIG. 2B, output unit 240 may include display 242 and one or more audio speakers 244 (hereinafter "audio speaker(s) 244"). As further shown in FIG. 2B, in some implementations, output unit 240 may optionally include one or more haptic actuators 248 (hereinafter "haptic actuator(s) 248"). Display 242 may be implemented as a liquid crystal display (LCD), a light-emitting diode (LED) display, an organic light-emitting diode (OLED) display, a quantum dot (QD) display, or any other suitable display screen that performs a physical transformation of signals to light.

Output unit 240 corresponds in general to output unit 140, in FIG. 1. Thus, output unit 140 may share any of the characteristics attributed to output unit 240 by the present disclosure, and vice versa. It is noted that the specific features shown to be included in output unit 140/240 are merely exemplary, and in other implementations, output unit 140/240 may include more, or fewer, features than display 242, audio speaker(s) 244, and haptic actuator(s) 248.

Figure 3:
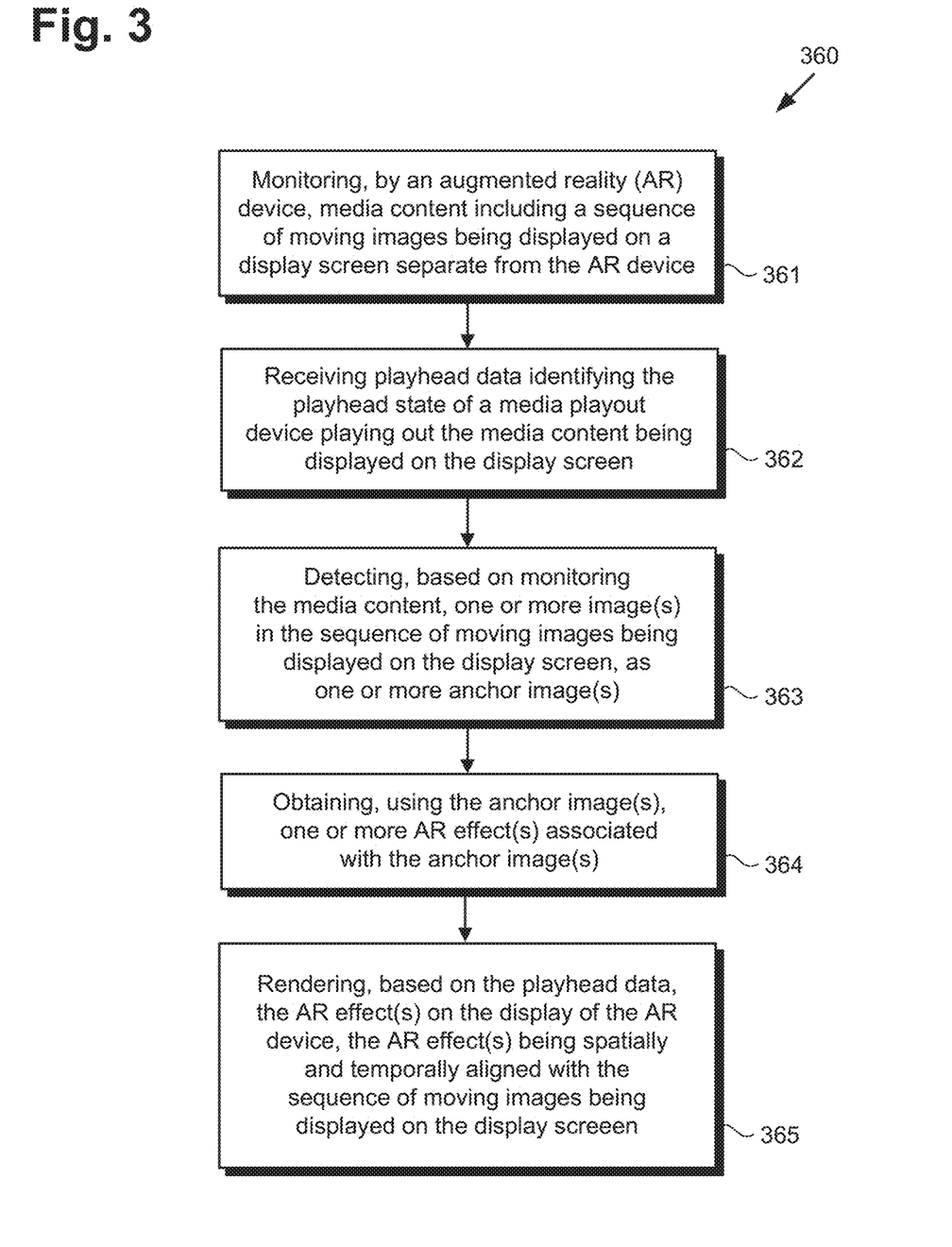
FIG. 3 shows a flowchart presenting an exemplary method for use by a system to provide AR enhancement of moving images, according to one implementation.

The functionality of media enhancement system 100 will be further described by reference to FIG. 3. FIG. 3 shows flowchart 360 presenting an exemplary method for use by media enhancement system 100 to provide AR enhancement of moving images, according to one implementation. With respect to the method outlined in FIG. 3, it is noted that certain details and features have been left out of flowchart 360 in order not to obscure the discussion of the inventive features in the present application.

Referring to FIG. 3, with further reference to FIGS. 1 and 2A, flowchart 360 includes monitoring media content 152 including a sequence of moving images being displayed on display screen 154 separate from AR device 102 (action 361). Monitoring of media content 152 in action 361 may include using one or more sensors/sensing modules 234. In one example, monitoring of media content 152 in action 361 may include using camera(s) 234a to capture imagery of the sequence of moving images being displayed on display screen 154.

In addition or alternatively, action 361 may include using one or more of lidar detector 234b, OR module 234e, P/L sensor(s) 234f, and microphone(s) 235 to provide location data 124 for use in determining a position of display screen 154 in relation to AR device 102, such as a position including one or more of an x, y, or z location coordinate of display screen 154 in relation to AR device 102. Moreover, where location data 124 includes audio data obtained by microphone(s) 235 as a result of monitoring media content 152, location data 124 may further include microphone metadata describing the angle of arrival of sound at microphone(s) 235. Action 361 may be performed by software code 110, executed by processing hardware 104 of AR device 102, and using features of input unit 130/230 as noted above.

Continuing to refer to FIGS. 1, 2A, and FIG. 3 in combination, flowchart 360 further includes receiving playhead data 156 indicating a playhead state of media playout device 150 playing media content 152 being displayed on display screen 154 (action 362). In some implementations, playhead data 156 may take the form of audio data output by media playout device during playout of media content 152 being displayed on display screen 154, and may be received using microphone(s) 235. However, in other implementations, playhead data 156 may be included in an inaudible wireless communication from media playout device 150 during playout of media content 152 being displayed on display screen 154, and may be received using transceiver 128 via wireless communication link 158. In yet other implementations, playhead data 156 may be received from remote media content source 151 of media content 152 being displayed on display screen 154, via communication network 108 and network communication links 118.

Playhead data 156 indicates the present playback state of media playout device 150, such as play, pause, fast forward, or rewind, for example, and may further indicate a timestamp or frame number of a presently displayed moving image of the sequence of moving images displayed on display screen 154. In addition, in some implementations, playhead data 156 may include one or more of a variety of playback parameters, such as audio level and including display screen parameters such as hue, saturation, brightness, contrast, and tint, for example. Playhead data 156 may be received in action 362 by software code 110, executed by processing hardware 104 of AR device 102, and using one of transceiver 128 or microphone(s) 235. It is noted that although flowchart 360 lists action 362 as following action 361, that representation is merely exemplary. In various implementations, action 362 may precede action 361, may follow action 361, or may be performed in parallel with action 361, i.e., contemporaneously with action 361.

Continuing to refer to FIGS. 1, 2A, and FIG. 3 in combination, flowchart 360 further includes detecting, based on monitoring media content 152, one or more images in the sequence of moving images being displayed on display screen 154, as one or more anchor images (action 363). As defined above, the term "anchor image" refers to an image serving as a 2D image template upon which one or more AR effects may be overlaid, or from which one or more AR effects may extend into an environment in which display screen 154 displaying the anchor image is located. In various use cases, such an anchor image may be a single frame of the sequence of moving images being displayed on display screen 154, an image included in a portion of a single frame of the sequence of moving images being displayed on display screen 154 that is less than the entire frame, or to a sequence of multiple frames within the sequence of moving images being displayed on display screen 154.

Figure 4:
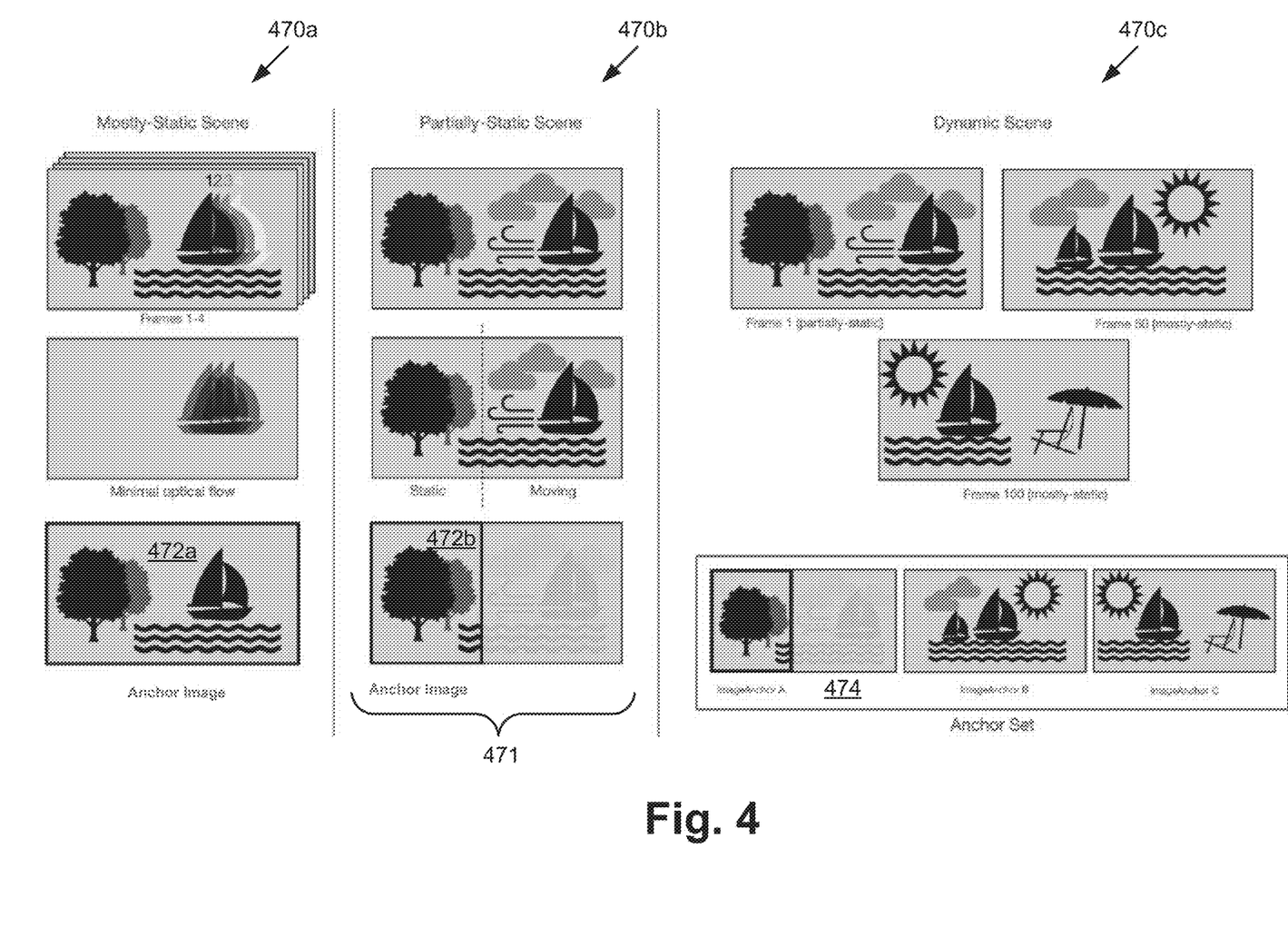
FIG. 4 shows respective diagrams depicting three exemplary use cases identifying one or more anchor images for use in providing AR enhancement of moving images, according to various implementations.

FIG. 4 shows respective diagrams 470a, 470b, and 470c depicting three exemplary use cases identifying one or more anchor images for use in providing AR enhancement of moving images, according to various implementations. As shown by diagram 470a, where a scene including multiple moving images includes only video frames that are mostly static, i.e., remain substantially the same from video frame to video frame, any one of the video frames within that scene may serve as anchor image 472a. That is to say, anchor image 472a is the entire video frame that includes the mostly static boat, water, and tree. It is noted that, as used in the present application, the term "scene," as applied to video content, is a shot or series of shots that together deliver a single, complete and unified dramatic element of film narration, or block of storytelling within a film. Moreover, as used in the present application, the term "shot" refers to a sequence of frames of video that are captured from a unique camera perspective without cuts or other cinematic transitions.

As further shown by diagram 470b, where a scene including multiple moving images includes video frames that are partially-static, i.e., some elements change significantly from video frame to video frame but include some imagery that is mostly static from video frame to video frame, that static imagery portion of any one of the video frames within that scene may serve as anchor image 472b. That is to say, anchor image 472b includes only the tree portion of video frame 471.

As yet further shown by diagram 470c, where a scene including multiple moving images includes video frames that are dynamic, i.e., video frames including imagery that changes substantially from video frame to video frame, a subset of multiple video frames, portions of video frames, or both, may serve as anchor set of images 474. With respect to the expression "imagery that changes substantially from video frame to video frame," that expression refers to change of the composition as a whole of the imagery from frame-to-frame. In diagram 470c, for example, the boat changes location from frame right, to frame center, to frame left, while other features, such as a tree, umbrella, and chair move and appear or disappear at different timestamps.

In some implementations, the one or more anchor images detected in action 363 may be manually predetermined. However, in other implementations, the one or more anchor images detected in action 363 may be detected algorithmically.

Figure 5A:
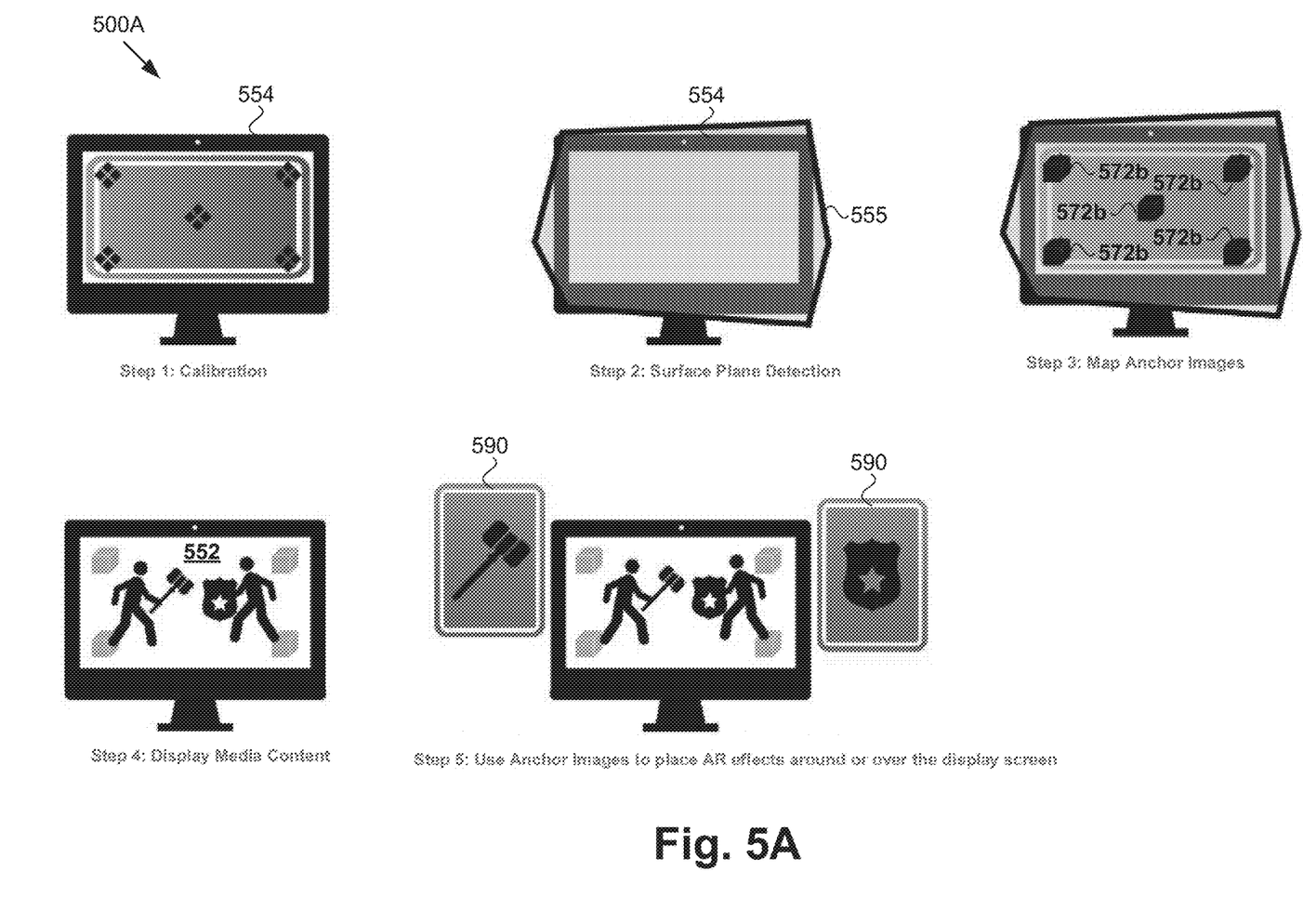
FIG. 5A shows a diagram depicting a process for using an anchor image to trigger the display of AR effects, according to one implementation.

FIG. 5A shows diagram 500A depicting a process for using an anchor image to trigger the display of AR effects 590, according to one implementation. Also shown in FIG. 5A are display screen 554, anchor images 572b, and media content 552. It is noted that display screen 554 and media content 552 correspond respectively in general to display screen 154 and media content 152, in FIG. 1. Consequently, display screen 554 and media content 552 may share any of the characteristics attributed to respective display screen 154 and media content 152 by the present disclosure, and vice versa. In addition, anchor images 572b, in FIG. 5A, correspond in general to anchor image 472b, in FIG. 4, and those corresponding features may share any of the characteristics attributed to either corresponding feature in the present disclosure.

According to the process depicted in diagram 500A, a calibration step is first performed in which a known image is displayed on display screen 554 for calibration. The calibration image may be detected using AR, and its area may be determined. Then with the help of AR, a flat vertical plane 555 can be located on the surface of display screen 554 (hereinafter "surface plane 555"). It is noted that although flat vertical plane is shown to be a hexagon in FIG. 5A, that representation is provided merely visually distinguish flat vertical plane 555 from display screen 554. In other implementations, flat vertical plane 555 may have a square or rectangular shape approximating or substantially matching the dimensions of display screen 554.

After the calibration image and surface plane 555 of display screen 554 have been detected, known points and positions from the calibration image can be mapped as anchor images 572b onto surface plane 555 of display screen 554. Once anchor images 572b are in place, the calibration image can be removed, and media content 552 can be displayed. Anchor images 572b on surface plane 555 can be used to place AR effects 590 around or over display screen 554.

Figure 5B:
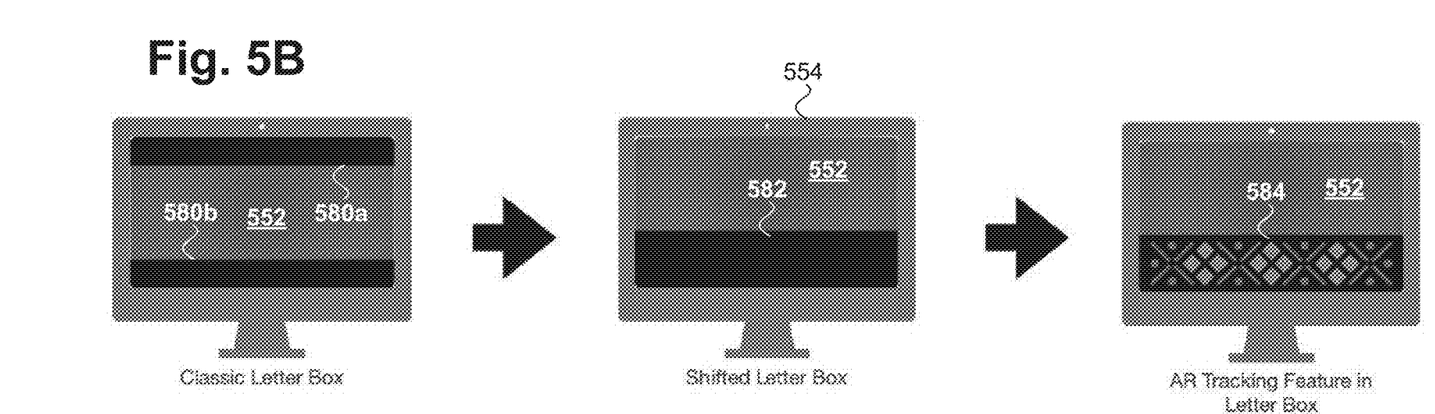
FIG. 5B shows a diagram depicting a process for enabling detection of anchor images, according to one implementation.
Figure 5C:
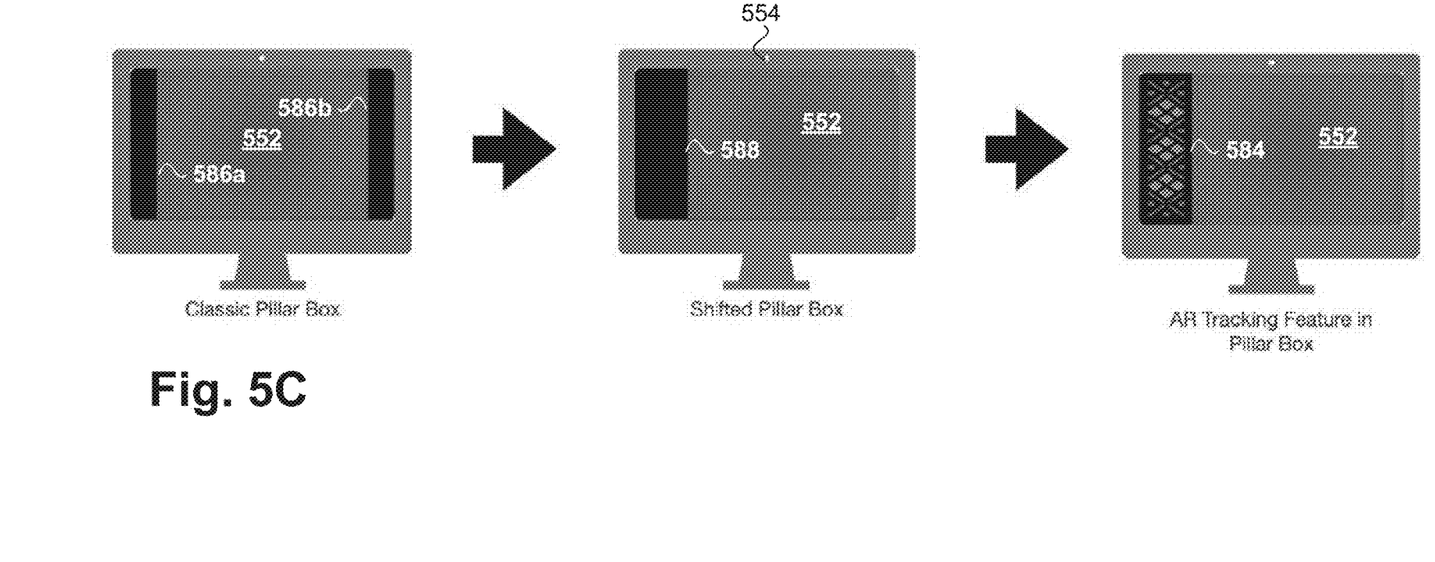
FIG. 5C shows a diagram depicting a process for enabling detection of anchor images, according to another implementation.

FIG. 5B shows diagram 500B depicting a process for enabling detection of anchor images, according to one implementation, while FIG. 5C shows diagram 500C depicting a process for enabling detection of anchor images, according to another implementation. It is noted that any feature in FIGS. 5B and 5C identified by a reference number identical to one shown in FIG. 5A corresponds to that previously identified feature. Regarding the implementation shown in FIG. 5B, it is noted that most modern widescreen television sets have a 16:9 aspect ratio, while movies are typically shot in a 2.39:1 aspect ratio. This typically causes black bars, or "mattes," (hereinafter "mattes") to appear above (i.e., matte 580a) and below (i.e., matte 580b) media content 552 being shown on display screen 554, known as letterboxing. This is due to the 2.39:1 ratio being longer and shorter than the 16:9 display screen 554 media content 552 is displayed on. By default, mattes 580a and 580b are equally sized above and below media content 552. However, as shown in FIG. 5B the present approach shifts media content 552 as far up on display screen 554 as possible and moves the extra pixels from the top matte 580a to the bottom, thereby creating double-wide area 582 of unused screen space below media content 552. With this double-wide area 582, content matching designs 584 can be placed that match video frames, shots, or scenes within media content 552 and may serve to identify images bordered by content matching designs 584 as anchor images of media content 552. Then using one or more of sensors/sensing modules 234 of input unit 230, in FIG. 2A, enabling image detection and tracking, the size and position of media content 552 on display screen 554 can be tracked, and AR effects may be rendered to appear on or around display screen 554.

It is noted that although diagram 500B depicts media content 552 being shifted to the top of display screen 554, and using double-wide area 582 at the bottom of display screen 554 for content matching designs 584, that representation is merely by way of example. In other implementations, media content 552 may be shifted to the bottom of display screen 554, and double-wide area 582 for content matching designs 584 may be at the top of display screen 554.

Regarding the implementation shown in FIG. 5C, the approach used in FIG. 5B is adapted for use with pillar box display of media content 552 in which black pillar box regions 586a and 586b appear adjacent to the left and right sides of media content 552. As shown in FIG. 5C, the present approach shifts media content 552 as far to the right on display screen 554 as possible, from the perspective of a viewer of display screen 554, and moves the extra pixels from the right pillar box region 586b to the left pillar box region 586a, thereby creating a double-wide region 588 of unused screen space to the left of media content 552. With this double-wide region 588, content matching designs 584 can be placed that match video frames, shots, or scenes within media content 552, and may serve to identify images bordered by content matching designs 584 as anchor images of media content 552. Then using one or more of sensors/sensing modules 234 of input unit 230, in FIG. 2A, enabling image detection and tracking, the size and position of media content 552 on display screen 554 can be tracked, and AR effects may be rendered to appear on or around display screen 554.

It is noted that although diagram 500C depicts media content 552 being shifted to the right on display screen 554, and using double-wide region 588 on the left of display screen 554 for content matching designs 584, that representation is merely by way of example. In other implementations, media content 552 may be shifted to the left of display screen 554, and double-wide region 588 for content matching designs 584 may be on the right of display screen 554. It is further noted that one advantage to the approaches shown by FIGS. 5A, 5B, and 5C is that they enable the identification of anchor images for triggering AR effects for a user having an AR device while concurrently enabling a viewer of display screen 554 who does not possess an AR device to view media content 552 without visual disruption.

Referring once again to FIG. 3, action 363 may be performed by software code 110, executed by processing hardware 104 of AR device 102. It is noted that although flowchart 360 lists action 363 as following actions 361 and 362, that representation is merely exemplary. In various implementations, action 363 may precede action 362, may follow action 362, or may be performed in parallel with one of both of actions 361 and 362, i.e., contemporaneously with one or both of actions 361 and 362.

Flowchart 360 further includes obtaining, using the one or more anchor image(s) detected in action 363, one or more AR effect(s) 190 associated with the one or more anchor image(s) (action 364). Referring to FIG. 1, in some implementations, some or all of AR effect(s) 190 may be predetermined and stored in AR effects database 122. In those implementations, the some or all of predetermined AR effects 190 may be obtained in action 364 by being retrieved from AR effects database 122. However, in other implementations, some or all of AR effect(s) 190 may be obtained in action 364 by being generated by AR device 102 using AR effects generator 120. Whether AR effect(s) 190 are obtained by being retrieved from AR effects database 122, by being generated using AR effects generator 120, or both, action 364 may be performed by software code 110, executed by processing hardware 104 of AR device 102.

Referring to FIGS. 1, 2B, and FIG. 3 in combination, flowchart 360 further includes rendering, based on playhead data 156 received in action 362, AR effect(s) 190 on display 242 of AR device 102, wherein AR effect(s) 190 are spatially and temporally aligned with the sequence of moving images being displayed on display screen 154 (action 365). As noted above, action 361 may include determining the position of display screen 154 in relation to AR device 102, such as one or more of an x, y, or z location coordinate of display screen 154 in relation to AR device 102. In those implementations, AR effect(s) 190 may be rendered on display 242 of AR device 102 further based on the position of display screen 154 in relation to AR device 102. Action 365 may be performed by software code 110, executed by processing hardware 104 of AR device 102.

Figure 6:
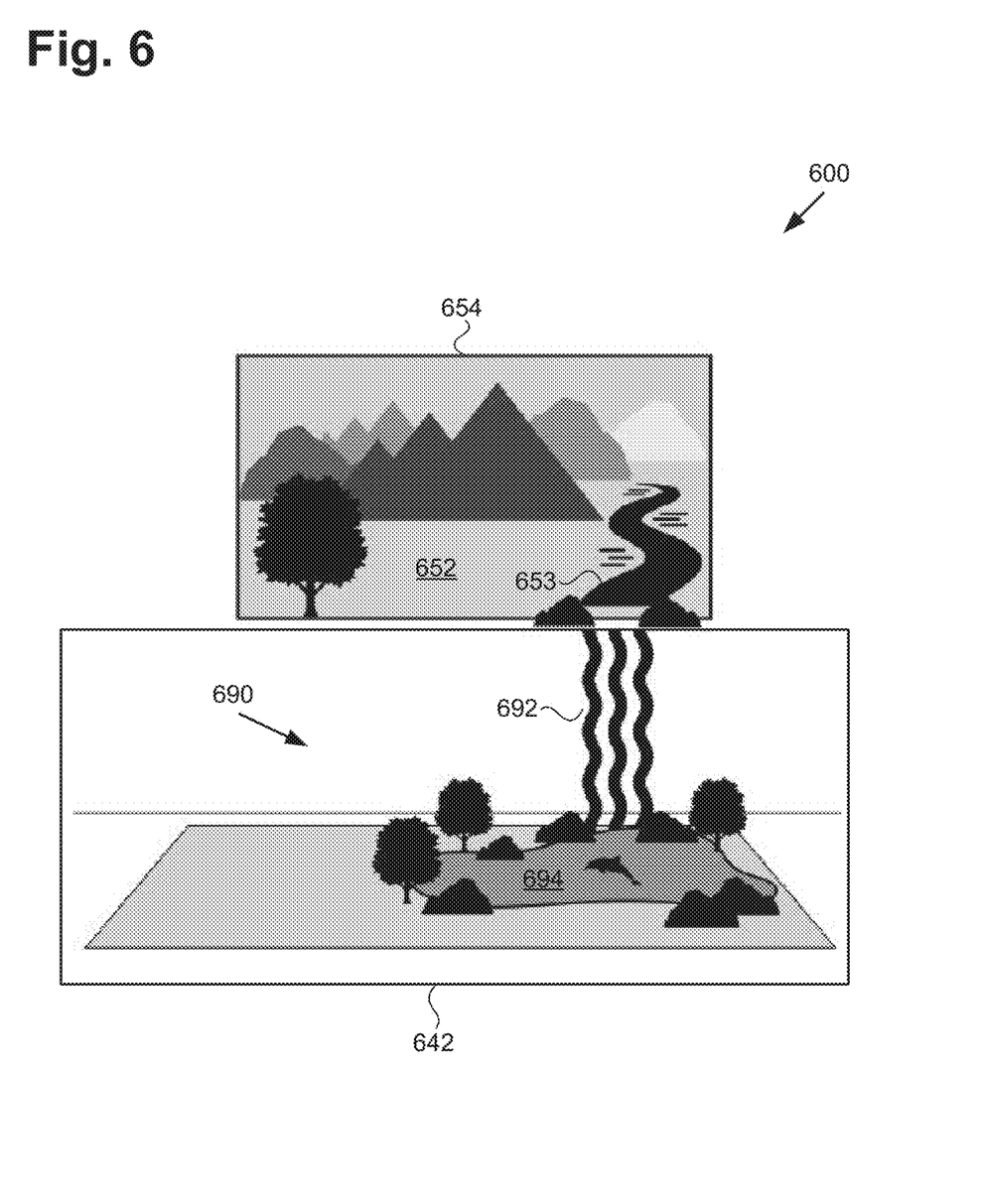
FIG. 6 shows a diagram depicting AR enhancement of media content including moving images, according to one implementation.

FIG. 6 shows diagram 600 depicting AR enhancement of media content 652 including moving images, according to one implementation. As shown in FIG. 6, media content 652 is being displayed on display screen 654, and is enhanced by AR effect(s) 690 rendered on display 642. As further shown in FIG. 6, AR effect(s) 690 include waterfall 692 and plunge pool 694 at the base of waterfall 692. Also shown in FIG. 6 is river 653 of media content 652, displayed using a sequence of moving images on display screen 654.

Media content 652, display screen 654, and AR effect(s) 690 correspond respectively to media content 152, display screen 154, and AR effect(s) 190, in FIG. 1. That is to say, media content 152, display screen 154, and AR effect(s) 190, may share any of the characteristics attributed to respective media content 652, display screen 654, and AR effect(s) 690 by the present disclosure, and vice versa. Moreover, display 642, corresponds in general to display 242 of AR device 102, and those corresponding features may share any of the characteristics attributed to either of those corresponding features by the present disclosure.

It is noted that AR effect(s) 190/690 are spatially aligned with the sequence of moving images being displayed on display screen 154/654 such that river 653 appears to generate waterfall 692 and plunge pool 694. It is further noted that AR effect(s) 190/690 are temporally aligned with the sequence of moving images being displayed on display screen 154/654 such that the flow rate of river 653 appears to correspond to the volume of water falling into plunge pool 694. Furthermore. AR effect(s) 190/690 are temporally aligned with the sequence of moving images being displayed on display screen 154/654 in that AR effect(s) 190/690 appear and disappear contemporaneously with river 653 to which they correspond.

In some implementations, the method outlined by flowchart 360 may conclude with action 365 described above. However, in other implementations, processing hardware 104 of AR device 102 may further execute software code 110 to generate one or more audio effects corresponding to AR effect(s) 190/690, one or more haptic effects corresponding to AR effect(s) 190/690, or one or more audio effects and one or more haptic effects corresponding to AR effect(s) 190/690. In those implementations, the method outlined by flowchart 360 may further include, rendering, by software code 110 executed by processing hardware 104, while rendering AR effect(s) 190/690 on display 242/642 of AR device 102, the one or more audio effects using audio speaker(s) 244, or the one or more haptic effects using haptic actuator(s) 248, or the one or more audio effects using audio speaker(s) 244 and the one or more haptic effects using haptic actuator(s) 248. Alternatively, or in addition, processing hardware 104 of AR device 102 may further execute software code 110 to detect one or more Internet of Things (IoT) connected devices in the environment in which display screen 154/654 is located, and may activate those one or more IoT connected devices to produce ambient effects, such as lighting, temperature, aromas, and the like, to further enhance media content 152/652 while AR effect(s) 190/690 are being rendered.

With respect to the method outlined by flowchart 360, it is emphasized that actions 361, 362, 363, 364, and 365 may be performed as an automated method.

Thus, as described above, the present application discloses systems and methods for providing AR enhancement of moving images. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An augmented reality (AR) device for use in an environment including a display screen located physically separate and apart from the AR device, the AR device comprising:
   an AR display;
   a memory storing a software code; and
   a processing hardware configured to execute the software code to:
      monitor a media content including a sequence of moving images being displayed on the display screen located physically separate and apart from the AR device;
      receive playhead data indicating a playhead state of a media playout device playing out the media content being displayed on the display screen located physically separate and apart from the AR device;
      detect, based on monitoring the media content being displayed on the display screen, at least one image in the sequence of moving images being displayed on the display screen, as at least one anchor image;
      obtain, using the at least one anchor image, one or more AR effects associated with the at least one anchor image; and
      render, based on the playhead data, the one or more AR effects on the AR display of the AR device, wherein the one or more AR effects are spatially and temporally aligned with the sequence of moving images being displayed on the display screen located physically separate and apart from the AR device.

2. The AR device of claim 1, wherein the processing hardware is further configured to execute the software code to determine a position of the display screen in relation to the AR device, and wherein the one or more AR effects are rendered on the display of the AR device further based on the position of the display screen in relation to the AR device.

3. The AR device of claim 2, wherein the display screen is a television screen, and the position includes at least one of an x, y, or z location coordinate of the display screen in relation to the AR device.

4. The AR device of claim 1, wherein the at least one anchor image comprises a plurality of anchor images.

5. The AR device of claim 4, wherein the plurality of anchor images include at least one of a portion of one of the sequence of moving images or one of the sequence of moving images.

6. The AR device of claim 1, wherein the at least one anchor image is one of manually predetermined or detected algorithmically.

7. The AR device of claim of claim 1, wherein the playhead data is received as one of audio data output by the media playout device or an inaudible wireless communication from the media playout device during playout of the media content being displayed on the display screen.

8. The AR device of claim 1, wherein the processing hardware is further configured to execute the software code to:
perform a calibration, before monitoring the media content including the sequence of moving images, to a calibration image displayed on the display screen;
generate, using the calibration, a virtual surface at a surface of the display screen; and
map the at least one anchor image to the virtual surface.

9. The AR device of claim 1, wherein the playhead data is received from a remote source of the media content being displayed on the display screen.

10. The AR device of claim 1, wherein the AR device further comprises at least one of an audio speaker or a haptic actuator, and wherein the processing hardware is further configured to execute the software code to:
generate at least one of an audio effect or a haptic effect corresponding to the one or more AR effects; and
render, while rendering the one or more AR effects on the display of the AR device, at least one of the audio effect using the audio speaker or the haptic effect using the haptic actuator.

11. The AR device of claim 1, wherein the at least one image in the sequence of moving images being displayed on the display screen is detected to be the at least one anchor image based on a content matching pattern bordering the at least one image.

12. A method for use by an augmented reality (AR) device in an environment including a display screen located physically separate and apart from the AR device, the AR device having a display, processing hardware, and a memory storing a software code, the method comprising:
monitoring, by the software code executed by the processing hardware, a media content including a sequence of moving images being displayed on the display screen located physically separate and apart from the AR device;
receiving, by the software code executed by the processing hardware, playhead data indicating a playhead state of a media playout device playing out the media content being displayed on the display screen located physically separate and apart from the AR device;
detecting, by the software code executed by the processing hardware based on monitoring the media content being displayed on the display screen, at least one image in the sequence of moving images being displayed on the display screen, as at least one anchor image;
obtaining, by the software code executed by the processing hardware and using the at least one anchor image, one or more AR effects associated with the at least one anchor image; and
rendering, by the software code executed by the processing hardware based on the playhead data, the one or more AR effects on the AR display of the AR device, wherein the one or more AR effects are spatially and temporally aligned with the sequence of moving images being displayed on the display screen located physically separate and apart from the AR device.

13. The method of claim 12, further comprising:
determining, by the software code executed by the processing hardware, a position of the display screen in relation to the AR device, and wherein the one or more AR effects are rendered on the display of the AR device further based on the position of the display screen in relation to the AR device.

14. The method of claim 13, wherein the display screen is a television screen, and the position includes at least one of an x, y, or z location coordinate of the display screen in relation to the AR device.

15. The method of claim 12, wherein the at least one anchor image comprises a plurality of anchor images.

16. The method of claim 15, wherein the plurality of anchor images include at least one of a portion of one of the sequence of moving images or one of the sequence of moving images.

17. The method of claim 12, wherein the at least one anchor image is one of manually predetermined or detected algorithmically.

18. The method of claim 12, wherein the playhead data is received as one of audio data output by the media playout device or an inaudible wireless communication from the media playout device during playout of the media content being displayed on the display screen.

19. The method of claim 12, further comprising:
performing a calibration, by the software code executed by the processing hardware before monitoring the media content including the sequence of moving images, to a calibration image displayed on the display screen;
generating, by the software code executed by the processing hardware and using the calibration, a virtual surface at a surface of the display screen; and
mapping, by the software code executed by the processing hardware, the at least one anchor image to the virtual surface.

20. The method of claim 12, wherein the playhead data is received from a remote source of the media content being displayed on the display screen.

21. The method of claim 12, wherein the AR device further comprises at least one of an audio speaker or a haptic actuator, the method further comprising:
generating, by the software code executed by the processing hardware, at least one of an audio effect or a haptic effect corresponding to the one or more AR effects; and
rendering, by the software code executed by the processing hardware while rendering the one or more AR effects on the display of the AR device, at least one of the audio effect using the audio speaker or the haptic effect using the haptic actuator.

22. The method of claim 12, wherein the at least one image in the sequence of moving images being displayed on the display screen is detected to be the at least one anchor image based on a content matching pattern bordering the at least one image.

* * * * *